(12) United States Patent
Flatsoussis

(10) Patent No.: US 10,174,919 B1
(45) Date of Patent: Jan. 8, 2019

(54) LIGHT FOR INSECTICIDE BAIT GEL DISPENSER

(71) Applicant: Peter Greg Flatsoussis, Chicago, IL (US)

(72) Inventor: Peter Greg Flatsoussis, Chicago, IL (US)

( * ) Notice: Subject to any disclaimer, the term of this patent is extended or adjusted under 35 U.S.C. 154(b) by 129 days.

(21) Appl. No.: 14/668,477

(22) Filed: Mar. 25, 2015

Related U.S. Application Data

(60) Provisional application No. 62/125,870, filed on Feb. 2, 2015, provisional application No. 61/967,718, filed on Mar. 25, 2014.

(51) Int. Cl.
| | | |
|---|---|---|
| *F21V 33/00* | (2006.01) | |
| *F21V 21/088* | (2006.01) | |
| *A01M 7/00* | (2006.01) | |
| *F21L 4/08* | (2006.01) | |
| *F21Y 101/02* | (2006.01) | |
| *F21W 131/30* | (2006.01) | |

(52) U.S. Cl.
CPC ....... *F21V 21/0885* (2013.01); *A01M 7/0025* (2013.01); *F21L 4/08* (2013.01); *F21V 33/0004* (2013.01); *F21W 2131/30* (2013.01); *F21Y 2101/02* (2013.01)

(58) Field of Classification Search
CPC ............. F21V 21/0885; F21V 33/0004; F21V 33/0044; F21V 33/008; F21V 33/0084; A01M 7/0025; F21L 4/08; F21W 2131/30; F21Y 2101/02; A61C 1/088; B43K 290/10; A01K 97/02; A61L 2209/12

USPC ........................................................ 362/109
See application file for complete search history.

(56) References Cited

U.S. PATENT DOCUMENTS

| | | | |
|---|---|---|---|
| 1,153,044 A | | 9/1915 | Dunham |
| 1,165,511 A | | 12/1915 | Jones |
| 1,181,261 A | | 5/1916 | Schmidt |
| 1,285,553 A | | 11/1918 | Bateman |
| 1,670,426 A | | 5/1928 | Weber |
| 2,240,195 A | | 4/1941 | Reiber |
| 2,252,267 A | | 8/1941 | Lofgren |
| 2,598,357 A | | 5/1952 | Coleman |
| 2,629,516 A | | 2/1953 | Badham |
| 2,753,438 A | | 7/1956 | Cialoni |
| 3,035,738 A | | 5/1962 | Bloom |
| 3,128,952 A | | 4/1964 | Bloom |
| 3,784,804 A | | 1/1974 | Sabatelli et al. |
| 3,812,340 A | | 5/1974 | Brandt |
| 4,515,295 A | * | 5/1985 | Dougherty ............ A61F 9/0008 222/113 |
| 4,912,750 A | | 3/1990 | Foster |
| 5,021,237 A | * | 6/1991 | Bruey .................. A01N 25/006 424/43 |

(Continued)

*Primary Examiner* — Evan Dzierzynski
*Assistant Examiner* — Omar Rojas Cadima
(74) *Attorney, Agent, or Firm* — Erickson Law Group, PC

(57) ABSTRACT

A clip-on light assembly includes a semi-cylindrical body that fits onto a cylindrical reservoir of fluid to be dispensed and a light carried at a front of the body and projecting a light beam in front of a dispensing tip of the reservoir. A battery is carried by the body and is electrically connected to the light. The light can be an LED. A circuit board carries a circuit electrically connected to the LED, the circuit board and battery contained in a compartment fixed to the body. The circuit can include a port for recharging the battery via a cord.

14 Claims, 5 Drawing Sheets

(56) References Cited

U.S. PATENT DOCUMENTS

| | | |
|---|---|---|
| 5,448,459 A | 9/1995 | Rogers |
| 5,797,670 A | 8/1998 | Snoke et al. |
| 5,807,334 A * | 9/1998 | Hodosh ............... A61M 5/20 |
| | | 604/131 |
| 5,895,159 A | 4/1999 | Liou |
| 5,941,629 A | 8/1999 | Tuscher |
| 6,092,260 A | 7/2000 | Kai |
| 6,390,333 B1 | 5/2002 | Bozzo |
| 7,108,395 B2 * | 9/2006 | Correa ............... A61B 17/30 |
| | | 362/119 |
| 7,575,334 B2 | 8/2009 | Becnel |
| 8,596,553 B2 * | 12/2013 | Klein, II ............ B05B 12/004 |
| | | 222/402.13 |
| 2002/0105796 A1 | 8/2002 | Naghi et al. |
| 2002/0105797 A1 | 8/2002 | Navid et al. |
| 2009/0097270 A1 * | 4/2009 | Becker ................ A61B 1/247 |
| | | 362/573 |
| 2012/0033232 A1 * | 2/2012 | Carr .................... A61B 90/35 |
| | | 356/614 |
| 2013/0020350 A1 | 1/2013 | Gardos et al. |
| 2013/0250548 A1 | 9/2013 | Carr et al. |

* cited by examiner

LIGHT FOR INSECTICIDE BAIT GEL DISPENSER

This application claims the benefit of U.S. Provisional Application 61/967,718, filed Mar. 25, 2014 and U.S. Provisional Application 62/125,870, filed Feb. 2, 2015.

BACKGROUND

This invention relates to a light emitting attachment to an insecticide bait gel dispenser used in the pest control business. A hand held bait gel dispenser is used to dispense insecticide bait gel by a skilled pest management technician to treat ant and cockroach infestations in residential and commercial establishments. The treatment is often performed in dark, poorly lit areas, such as under sinks, inside cabinets, and under drawers. A separate hand held flashlight is commonly used by the technician to inspect the infestations and see where to apply the insecticide for the best results.

US published patent application 2013/0020350 describes a dispensing gun that dispenses pesticide bait and includes an LED light. However, the light is built-in to be part of the gun, i.e., it is not a light that can be easily incorporated into a pre-existing gun not having a light. The LED is also set back from the dispensing tip.

The present inventor has recognized that it would be desirable to provide a light assembly that can be used with a gun-type fluid dispenser to effectively illuminate the area of dispensing. The present inventor has recognized that it would be desirable to provide a light assembly than is easily attached to a gun-type fluid dispenser. The present inventor has recognized that it would be desirable to provide a light assembly for an insecticide bait gel dispensing gun that was effective to illuminate the dark areas associated with the location of household pests.

SUMMARY

The invention provides a light assembly that can be attached directly to a hand held fluid dispenser, such as an insecticide bait gel dispenser apparatus, such that the area toward which the fluid is placed will be illuminated.

Although the light assembly of the invention is particularly useful for attaching to a bait gel dispenser apparatus, it could also be advantageously used to attach to other dispensing devices such as to a calking dispensing "gun."

This invention relates to a light emitting attachment to an insecticide bait gel dispenser used in the pest control business. A hand held bait gel dispenser is used to dispense insecticide bait gel by a skilled pest management technician to treat ant and cockroach infestations in residential and commercial establishments. This light emitting attachment can be easily attached directly to the dispenser, thus eliminating the need to hold a separate flashlight in the user's other hand and improving the visibility of the insecticide application. The light is advantageously located adjacent to the dispensing tip, thus reducing shadows or obstructions to direct illumination of the fluid being dispensed from the tip. The light emitting attachment can also be attached to various other types of tube-like dispensers.

According to one embodiment of the invention, the source of light is an LED (light emitting diode) white bulb 5 mm in size with 6.2 cd luminous. The bulb fits to the tip of a body formed by a hollow plastic tube with a circular cross section that is axially cut in half. The body snaps partially around the cylindrical insecticide bait gel reservoir. The light is at the tip projecting a light beam where the insecticide bait gel is being placed. Wires extend from the light along the inside of the hollow tube to an electrical connector, such as a MOLEX connector. The electrical connector runs to an on/off toggle switch, which connects the LED to the battery source. A battery case holding the battery source of one or more batteries can be affixed directly to the bait gel dispenser. Attached to, or contained within, the battery case can be a charge controller with a USB port for re-charging the battery source.

According to another embodiment, the switch and the battery are encased together and located on top of the body. Thus, the light, all electrical components and the battery form a single clip-on assembly.

The described embodiments of the invention provide a separate light assembly that is easily connectable to a conventional insecticide bait gel dispenser that allows illumination to the area where the dispenser is pointed. This illumination will improve accuracy of insecticide application and eliminates the need to hold a separate flashlight in the other hand.

Numerous other advantages and features of the present invention will be become readily apparent from the following detailed description of the invention and the embodiments thereof, and from the accompanying drawings.

DETAIL DESCRIPTION

Figure 1:
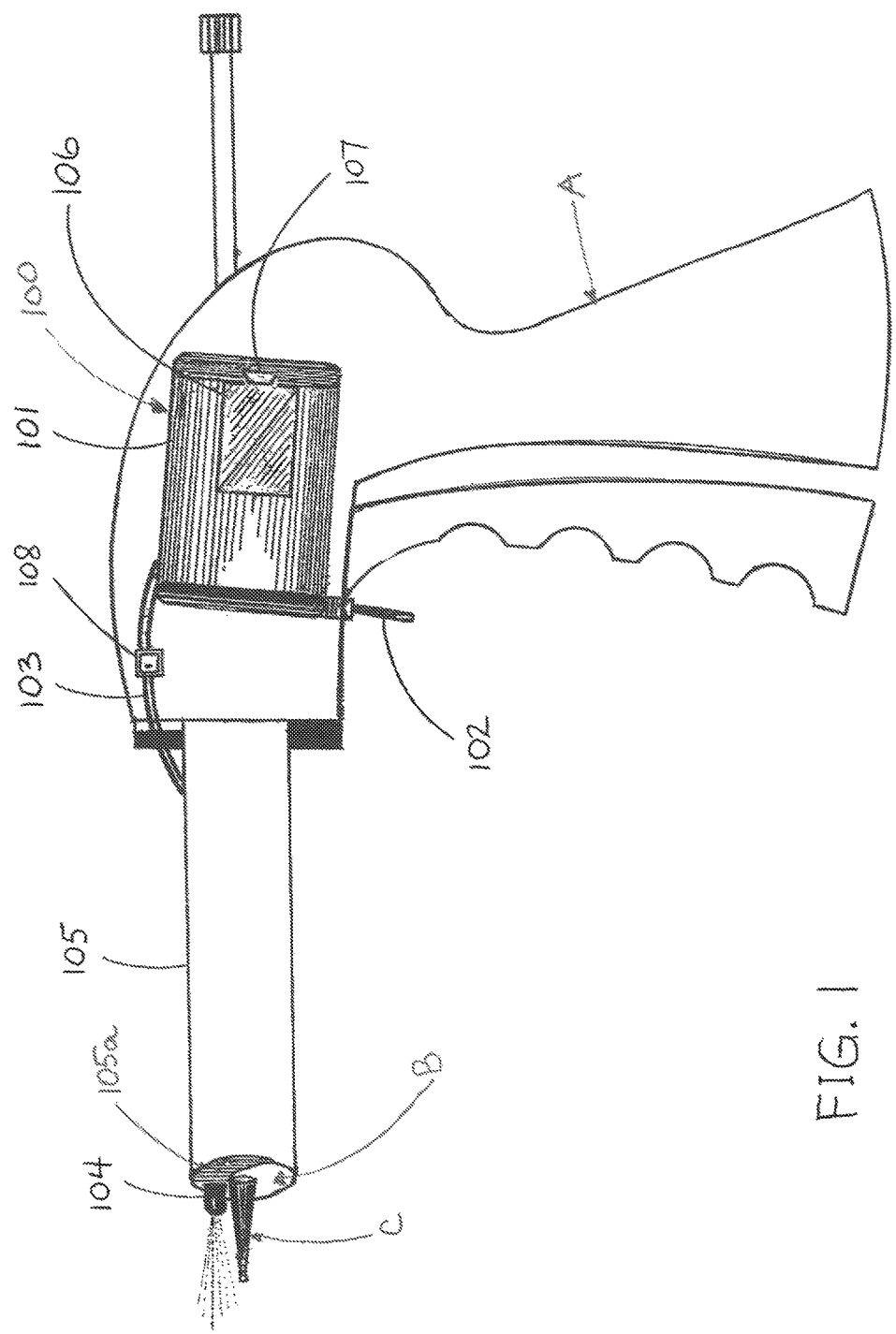
FIG. 1 is an elevation view of a bait dispensing gun incorporating a light assembly of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows a re-chargeable battery operated LED light with a battery charge controller and an on/off power switch mounted to an insecticide bait gel dispenser A.

A battery case 100 includes a battery 101 containing 3.6 volts of power, and includes a battery charge controller 106 board or circuit that has a standard USB port 107 that can be connected to a universal cellular phone charger for purposes of re-charging the battery 101. The battery 101 and toggle on/off switch 102 are mounted on the side of the hand-gripping portion of the dispenser. The toggle on/off switch 102 is located within the reach of thumb or fingers of the hand. When desired, the operator activates the toggle switch 102, which subsequently powers the LED light bulb 104. The power runs from a connector 108 (such as a MOLEX connector) through wires 103. The wires 103 are affixed inside a semi-cylindrical body 105 formed by a half cut hollow plastic tube, which partially surrounds the insecticide bait reservoir B, and connected to the LED light bulb 104. The LED bulb 104 is mounted on a crescent-shaped end wall 105a of the body 105 at the end tip of the dispenser so that the light shines directly on the area that the insecticide bait is being placed, in front of and away from the body 105. The end wall 105a extends past the end wall of the cylindrical bait gel reservoir B but the crescent shape allows clearance for the protruding dispensing tip C of the bait gel reservoir B. The body has no end wall opposite the end wall 105a which allows the body to snap onto the cylindrical bait gel reservoir B.

The semi-cylindrical body 105 is made of a half cut hollow plastic tube which is somewhat flexible to resiliently open its C-shaped cross section, so that it clips or snaps onto the reservoir B and stays in place. The body's flexibility allows it to detach and re-attach to the reservoir when needed.

Figure 2:
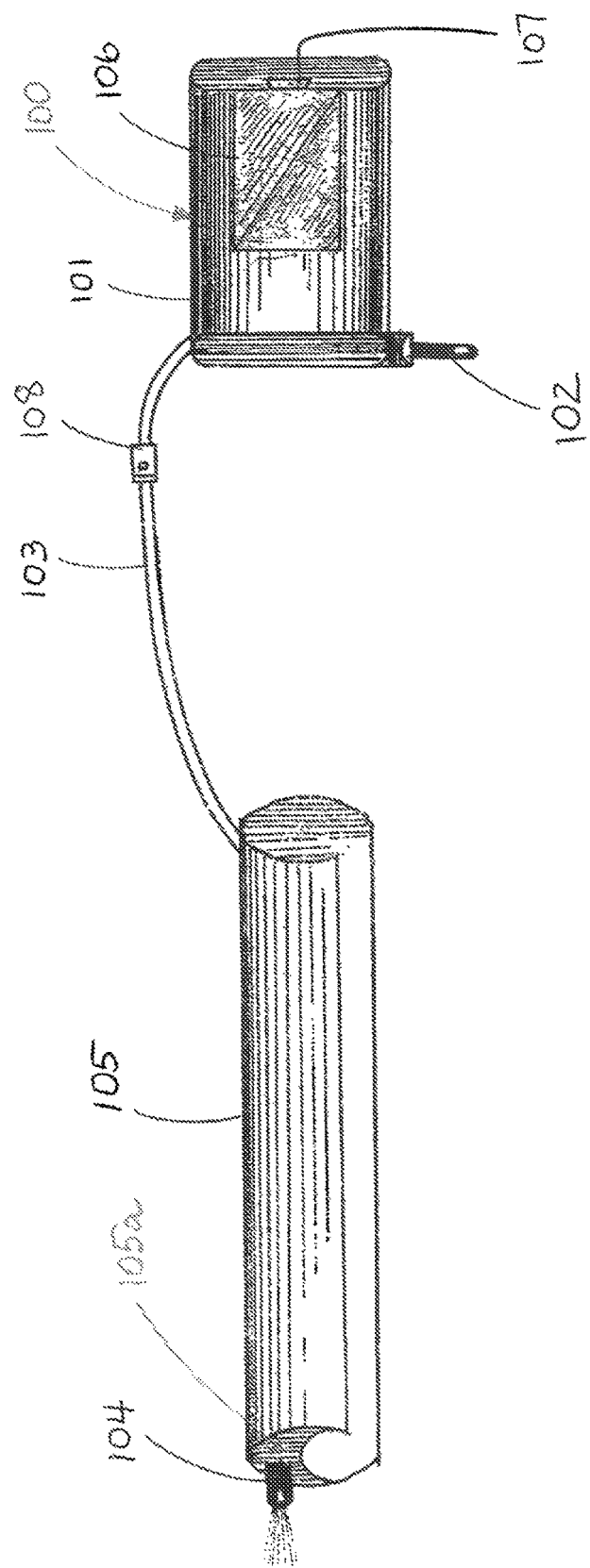
FIG. 2 is an elevation view of the light assembly of FIG. 1 separated from the bait dispensing gun.

FIG. 2 shows the re-chargeable battery operated LED light invention detached from the insecticide bait gel dispenser.

The LED light bulb 104 protrudes from the end wall 105a of the semi-cylindrical body 105, formed from the half-cut hollow plastic tube that snaps onto the insecticide bait reservoir B. Electricity flows through wires 103 running along the inside of the semi-cylindrical body 105. The wires 103 plug into the connector 108 that is attached to the on/off toggle switch 102. The on/off toggle switch 102 is attached to and controls the electricity powered by the re-chargeable 3.6-volt battery 101. The battery case 100 includes the battery charge controller 106, which has the micro USB (Universal Serial Bus) port 107 for re-charging purposes. The battery case 100 with the battery 101, the charge controller 106 and the on/off toggle switch 102 is one unit that is easily mounted on the side of the dispenser handle using clips, o-rings or strap-like material.

Figure 3:
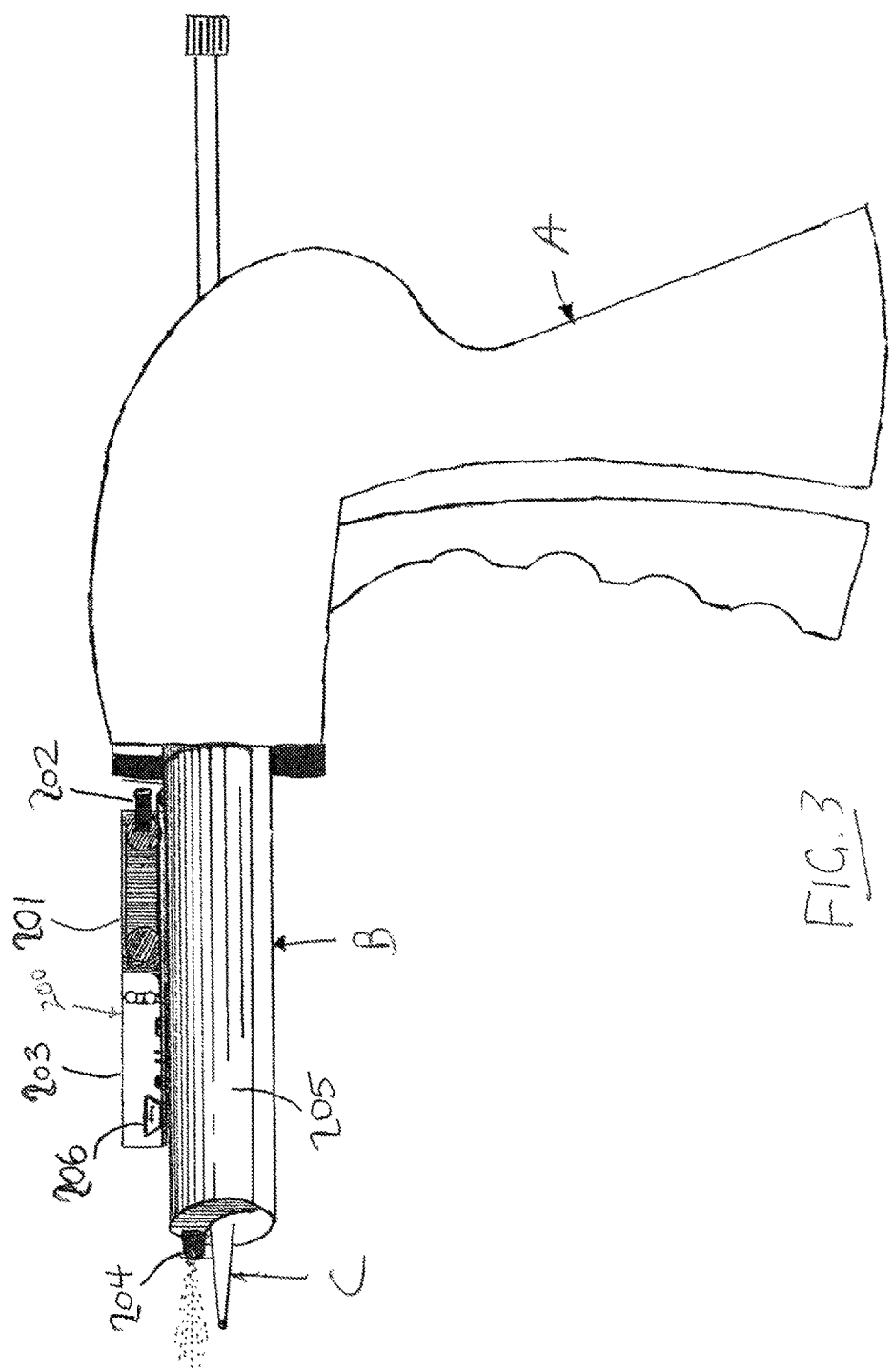
FIG. 3 is an elevation view of a bait dispensing gun incorporating an alternate embodiment light assembly of the present invention, with a side wall portion removed to reveal underlying components.

FIG. 3 shows an alternate embodiment of the light assembly of the invention attached to a reservoir B of a handheld dispenser A, which illuminates the area where the substance is being dispensed. The semi-cylindrical body 205 is made of a half cut hollow plastic tube which is somewhat flexible to resiliently open its C-shaped cross section, so that it clips or snaps onto the reservoir B and stays in place. The body's flexibility allows it to detach and re-attach to the reservoir B when needed. At the end of the body 205 is an LED bulb 204 which shines light directly in front of the dispensing substance. The LED bulb is powered by a battery 201 and an on/off power switch 202. The battery 201 can be replaceable or re-chargeable when connected to a battery charge controller 203 board or circuit that has a standard USB port 206 that can be connected to a universal cellular phone charger for purposes of re-charging. The battery 201 and the on/off switch 202 and the charge controller 203 are encased by a housing 200 that is fixed on top of the body 205.

The LED bulb 204 is mounted on a crescent-shaped end wall 205a of the body 205 at the end tip of the dispenser B so that the light shines directly on the area that the insecticide bait is being placed. The end wall 205a extends past the end wall of the cylindrical bait gel reservoir B but the crescent shape allows clearance for the protruding dispensing tip C of the bait gel reservoir B. The body 205 has no end wall opposite the end wall 205a which allows the body 205 to snap onto the cylindrical bait gel reservoir B.

When light is desired, the operator activates the on switch 202 and the power runs from the battery 201 through wires that are affixed inside the body 205, which partially surrounds the reservoir, reaching the LED bulb 204. The LED bulb 204 is mounted at the end tip of the body so that the light illuminates directly on the area that the dispensing substance is being placed.

Figure 4:
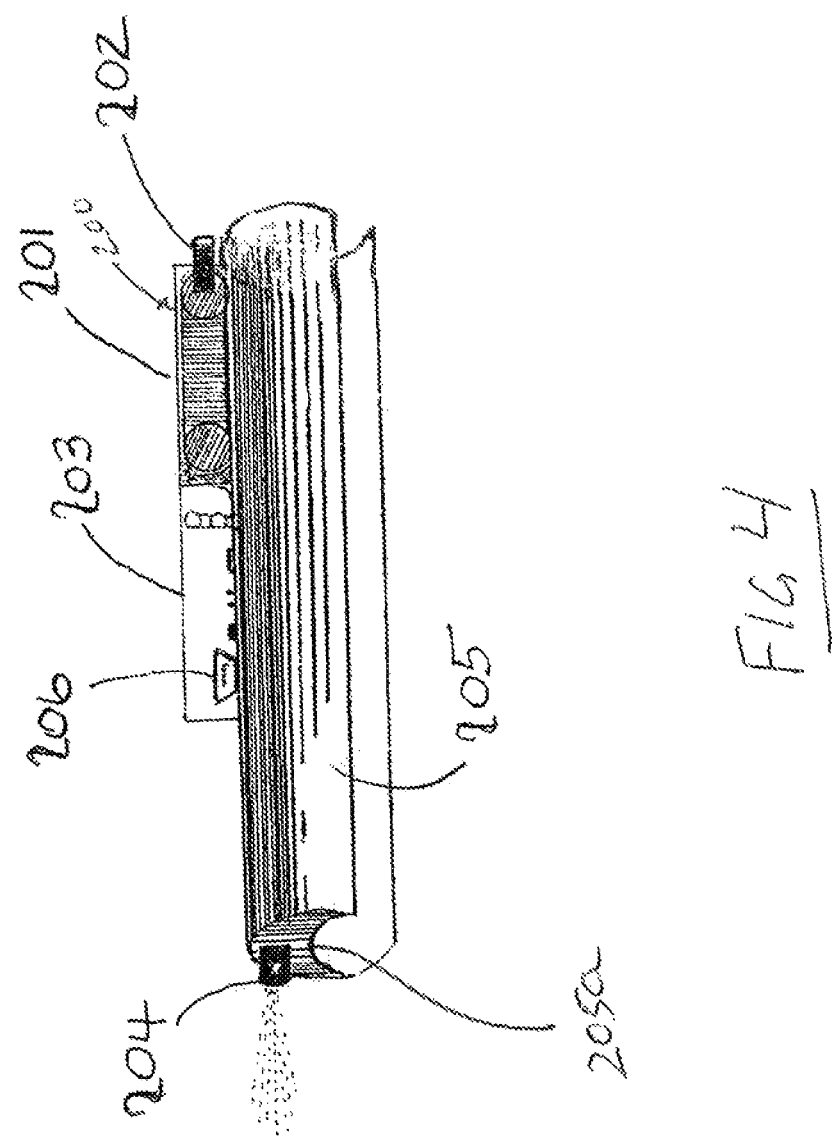
FIG. 4 is an elevation view of the light assembly of FIG. 3 separated from the bait dispensing gun.

FIG. 4 shows the light assembly detached from the dispenser.

The LED bulb 204 protrudes from the tip of the half-cut hollow plastic tube body 205 that connects onto the dispenser reservoir. Electricity flows through wires running along the inside of the body 205. The wires run to the on/off switch 202. The on/off switch 202 is attached to and controls the electricity powered by the re-chargeable battery 201. The battery 201 is attached to the charge controller 203, which has the micro USB (Universal Serial Bus) port 206 for re-charging purposes. The housing 200 with the battery 201, the charge controller 206 and the on/off switch 202 is fixed to the top of the body 205.

Figure 5:
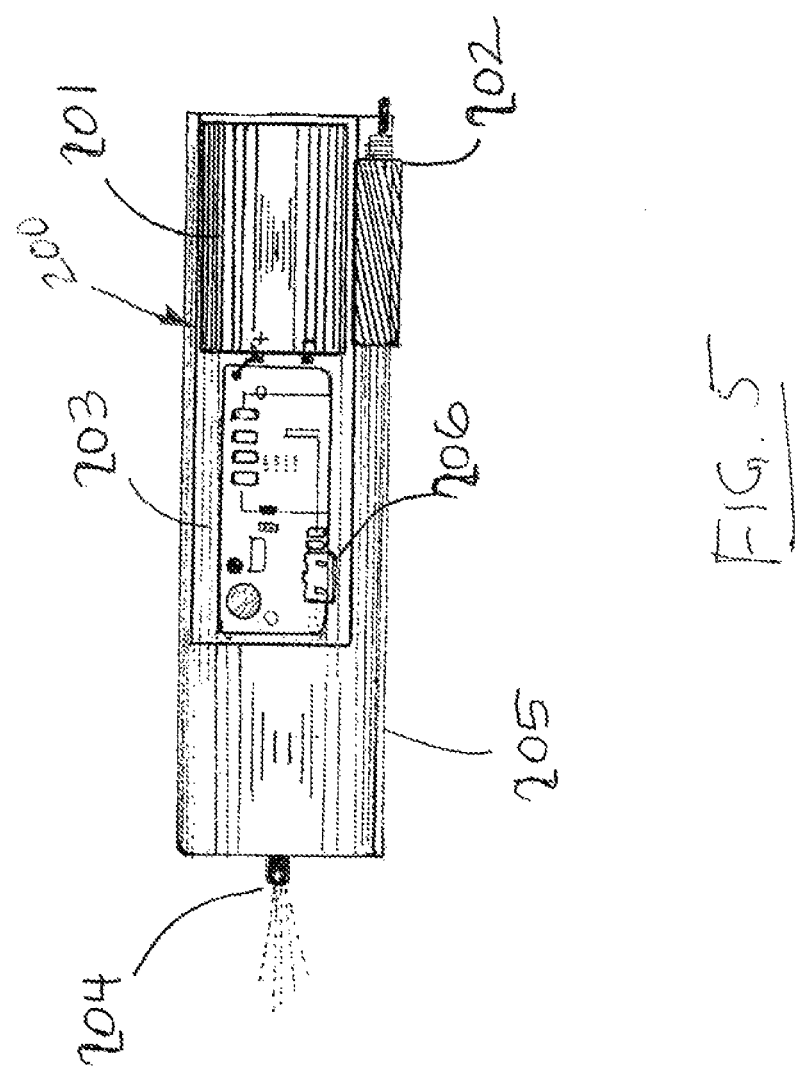
FIG. 5 is a plan view of the light assembly of FIG. 4 with a top wall portion removed to reveal underlying components.

FIG. 5 shows overhead view of the light assembly detached from the bait gel dispenser. The LED bulb 204 protrudes from the end wall 205a of the body 205 that clips onto the dispenser reservoir. Electricity flows through wires running along the inside of the body 205. The wires run to the on/off switch 202. The on/off switch 202 is attached to and controls the electricity powered by the re-chargeable battery 201. The battery 201 is attached to the charge controller 203, which has the micro USB (Universal Serial Bus) port 206 for re-charging purposes.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A clip-on light for a dispensing gun, comprising:
   a partial cylinder, resilient plastic body having a longitudinal axis and a C-shaped cross section providing a longitudinal gap, the body sized to resiliently snap fit onto a portion of a barrel of the dispensing gun, by the C-shaped cross section resiliently opening to grip the portion of the barrel within the C-shaped cross section;
   an end wall perpendicular to the longitudinal axis of the body that at least partially closes the C-shaped cross section at a forward end of the body, the end wall located in front of a front end wall of the barrel of the dispensing gun;
   a light mounted directly to the end wall and oriented to direct light in a forward axial direction away from the body; and
   a battery carried by the body on an outside of the C-shaped cross section, the battery electrically connected to the light.

2. The clip-on light according to claim 1, wherein the light comprises an LED.

3. The clip-on light according to claim 2, comprising a circuit board supporting a circuit electrically connected to the LED, the circuit board and battery contained in a compartment fixed to the body.

4. The clip-on light according to claim 1, wherein the barrel is a disposable cartridge holding gel to be dispensed, and the body is sized to resiliently clip-on to the cartridge.

5. The clip-on light according to claim 1, wherein a circuit that includes a port for recharging the battery via a cord supplied with household electrical power.

6. The clip-on light according to claim 1, wherein the partial cylinder, resilient plastic body has a length to fit over substantially the entire length of the barrel.

7. The clip-on light according to claim 1, wherein the end wall is crescent shaped to provide clearance for a dispensing tip of the barrel of a dispensing gun.

8. In combination, a pest control bait dispensing gun having a handle portion and a pump portion, the pump portion acting to pressurizing gel within a cylindrical reservoir of gel to be dispensed, the reservoir having a dispensing tip at a forward end, and a clip-on light assembly comprising a partial cylinder, resilient plastic body having a C-shaped cross section that resiliently snap fits onto a portion of the reservoir by the C-shaped cross section resiliently opening to grip the portion of the reservoir within the C-shaped cross section;
- an end wall perpendicular to the longitudinal axis of the body that at least partially closes the C-shaped cross section at a forward end of the body, the end wall located in front of a front end wall of the reservoir, and
- a light carried at a front of the body mounted directly on the end wall and projecting a light beam in front of the dispensing tip.

9. The combination according to claim 8, further comprising a battery carried by the body and electrically connected to the light.

10. The combination according to claim 9, wherein the light comprises an LED.

11. The combination according to claim 10, comprising a circuit board supporting a circuit electrically connected to the LED, the circuit board and battery contained in a compartment fixed to the body.

12. The combination according to claim 11, wherein the circuit includes a port for recharging the battery via a cord.

13. The combination according to claim 8, wherein the partial cylinder, resilient plastic body has a length to fit over substantially the entire length of the reservoir.

14. The combination according to claim 8, wherein the end wall is crescent shaped to provide clearance for the dispensing tip of the reservoir.

* * * * *